United States Patent
Kotake et al.

(10) Patent No.: US 11,713,375 B2
(45) Date of Patent: Aug. 1, 2023

(54) BARRIER MATERIAL FORMATION COMPOSITION, BARRIER MATERIAL, PRODUCTION METHOD FOR BARRIER MATERIAL, PRODUCT, AND PRODUCTION METHOD FOR PRODUCT

(71) Applicant: HITACHI CHEMICAL COMPANY, LTD., Tokyo (JP)

(72) Inventors: Tomohiko Kotake, Tokyo (JP); Tatsuya Makino, Tokyo (JP); Yuta Akasu, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 0 days.

(21) Appl. No.: 16/759,566

(22) PCT Filed: Oct. 31, 2018

(86) PCT No.: PCT/JP2018/040571
§ 371 (c)(1),
(2) Date: Apr. 27, 2020

(87) PCT Pub. No.: WO2019/088191
PCT Pub. Date: May 9, 2019

(65) Prior Publication Data
US 2020/0291189 A1  Sep. 17, 2020

(30) Foreign Application Priority Data

Oct. 31, 2017  (WO) .................. PCT/JP2017/039295

(51) Int. Cl.
| | | |
|---|---|---|
| *C08G 77/398* | (2006.01) |
| *C08J 5/18* | (2006.01) |
| *C09D 183/04* | (2006.01) |
| *C08G 77/18* | (2006.01) |
| *C08G 77/38* | (2006.01) |
| *C08G 79/10* | (2006.01) |
| *C08G 77/58* | (2006.01) |

(52) U.S. Cl.
CPC .......... *C08G 77/398* (2013.01); *C08G 77/18* (2013.01); *C08G 77/38* (2013.01); *C08G 77/58* (2013.01); *C08G 79/10* (2013.01); *C08J 5/18* (2013.01); *C09D 183/04* (2013.01)

(58) Field of Classification Search
CPC .................. C08G 77/398; C08G 77/58; B32B 2307/7244; B32B 2307/7246; C08K 5/5415
See application file for complete search history.

(56) References Cited

U.S. PATENT DOCUMENTS

| | | | |
|---|---|---|---|
| 5,200,237 A * | 4/1993 | Sugama ................. | C08G 77/58 427/380 |
| 6,503,634 B1 | 1/2003 | Utz et al. | |
| 2008/0125564 A1 * | 5/2008 | Endres ................... | C08G 77/58 528/32 |
| 2009/0146323 A1 * | 6/2009 | Katayama ............ | H01L 23/296 257/E33.059 |
| 2011/0262750 A1 * | 10/2011 | Taima ..................... | G02B 1/04 428/402 |
| 2012/0101222 A1 * | 4/2012 | Horstman .............. | C08G 77/58 524/588 |
| 2012/0271006 A1 * | 10/2012 | Shin ....................... | C08G 77/02 525/389 |
| 2020/0115503 A1 * | 4/2020 | Langerbeins ........ | C09K 3/1018 |
| 2020/0369833 A1 * | 11/2020 | Yang ...................... | B32B 15/20 |

FOREIGN PATENT DOCUMENTS

| | | | |
|---|---|---|---|
| CN | 101445604 A | | 6/2009 |
| CN | 101445605 A | | 6/2009 |
| CN | 104884554 A | | 9/2015 |
| JP | H4-045129 A | | 2/1992 |
| JP | H7-786185 B2 | | 9/1995 |
| JP | 2002-046208 A | | 2/2002 |
| JP | 2009-127021 A | | 6/2009 |
| JP | 2010-134043 | * | 6/2010 |
| JP | 2011-093195 A | | 5/2011 |
| JP | 2013-049834 A | | 3/2013 |
| JP | 2014-185293 A | | 10/2014 |
| JP | 6057582 B2 | | 1/2017 |
| WO | WO 2008/018981 A2 | * | 2/2008 |
| WO | WO 2015/156703 | * | 10/2015 |
| WO | WO 2018/193107 | * | 10/2018 |

OTHER PUBLICATIONS

Machine translation of JP 2013-049834 (no date).*

* cited by examiner

*Primary Examiner* — Marc S Zimmer
(74) *Attorney, Agent, or Firm* — Fitch, Even, Tabin & Flannery, LLP

(57) ABSTRACT

The present invention provides a barrier material formation composition comprising a silane oligomer, at least a part of the silane oligomer being modified with a metal alkoxide.

11 Claims, No Drawings

BARRIER MATERIAL FORMATION COMPOSITION, BARRIER MATERIAL, PRODUCTION METHOD FOR BARRIER MATERIAL, PRODUCT, AND PRODUCTION METHOD FOR PRODUCT

CROSS-REFERENCE TO RELATED APPLICATIONS

This application is a U.S. national phase application filed under 35 U.S.C. § 371 of International Application No. PCT/JP2018/040571, filed Oct. 31, 2018, designating the United States, which claims priority from International Application No. PCT/JP2017/039295, filed Oct. 31, 2017, which are hereby incorporated herein by reference in their entirety.

TECHNICAL FIELD

The present disclosure relates to a barrier material formation composition, a barrier material, a production method for the barrier material, a product, and a production method for the product.

BACKGROUND ART

Conventionally, it has been studied to seal an electronic component with a barrier film or the like in order to prevent moisture from permeating into a void space formed in the electronic component. For example, in Patent Literature 1, a barrier film laminate with a barrier film having an inorganic oxide layer laminated is described.

CITATION LIST

Patent Literature

Patent Literature 1: Japanese Unexamined Patent Publication No. 2001-093195

SUMMARY OF INVENTION

Technical Problem

However, since the barrier film laminate described in Patent Literature 1 is in a film form, applicable targets are restricted.

A sealing method in which a void space between members of an electronic component is filled with solder or the like is also employed. According to the method, however, the electronic component may be destroyed when a slight amount of moisture that has entered the void space expands by heating, so that use in a high temperature environment is restricted.

An object of the present invention is therefore to provide a barrier material applicable to objects in various shapes, excellent in moisture resistance, capable of sufficiently suppressing the fracture of the object due to expansion of moisture that has entered the internal part, even when exposed to a high temperature environment. Another object of the present invention is to provide a barrier material formation composition for forming the barrier material. Further, still another object of the present invention is to provide a production method for the barrier material, a product comprising the barrier material, and a production method for the product.

Solution to Problem

The present invention provides a barrier material formation composition comprising a silane oligomer, at least a part of the silane oligomer being modified with a metal alkoxide.

By applying such a composition to an object and heating it, a barrier material excellent in moisture resistance can be easily formed on the object. Further, the barrier material to be formed has flexibility and dehumidifying property, so that fracture of the object can be sufficiently suppressed even when the moisture which has entered the internal part of the object expands by heating.

In an aspect, the ratio of the total number of silicon atoms bonded to three oxygen atoms each and silicon atoms bonded to four oxygen atoms each relative to the total number of silicon atoms in the silane oligomer may be 50% or more.

In an aspect, the silane oligomer may have a silicon atom bonded to three oxygen atoms.

The composition in an aspect may further comprise a silane monomer.

In an aspect, the silane monomer may contain a silicon atom bonded to three or four oxygen atoms.

In an aspect, the silane monomer may be a silane monomer selected from the group consisting of alkyltrialkoxysilane, aryltrialkoxysilane, and tetraalkoxysilane.

In an aspect, the content of the silane monomer may be 100 parts by mass or less relative to 100 parts by mass of the silane oligomer.

In an aspect, the metal alkoxide may be an aluminum alkoxide.

The present invention also provides a production method for a barrier material formation composition, the method comprising a first step of providing a silane oligomer with at least a part thereof modified with a metal alkoxide, and a second step of mixing the silane oligomer and a silane monomer to obtain a barrier material formation composition.

In an aspect, the first step may include a step of causing a reaction between a silane oligomer and a metal alkoxide to modify at least a part of the silane oligomer with the metal alkoxide.

In an aspect, the first step may include a step of causing a reaction between a silane monomer and a metal alkoxide to form a silane oligomer with at least a part thereof modified with the metal alkoxide.

The present invention also provides a production method for a barrier material comprising a step of heating the barrier material formation composition to form a barrier material.

The present invention also provides a production method for a product having a moisture resistant treated member. The production method may comprise a first step of applying the barrier material formation composition to a member and a second step of heating the applied composition to form a barrier material on the member.

The present invention also provides a production method for a product having a first member and a second member joined to the first member, and a moisture resistant treated joint between the first member and the second member. The production method may comprise a first step of disposing the barrier material formation composition between a first member and a second member, and a second step of heating the composition to form a barrier material and joining the first member to the second member via the barrier material.

The present invention also provides a production method for a product having a moisture resistant member. The production method includes a first step of heating the barrier material formation composition to make a moisture resistant member having a bather material, and a second step of putting a plurality of members including the moisture resistant member together.

The present invention also provides a barrier material comprising a polysiloxane compound doped with a metal atom, a ratio of the total number of silicon atoms bonded to three oxygen atoms each and silicon atoms bonded to four oxygen atoms each relative to the total number of silicon atoms in the polysiloxane compound being 50% or more.

In an aspect, the polysiloxane compound may contain a silicone atom bonded to three oxygen atoms.

In the barrier material in an aspect, 90% or more of the oxygen atoms in the polysiloxane compound may bond to silicon atoms.

The barrier material in an aspect may have a moisture vapor transmission rate (40° C., 95% RH) per 25 μm thickness of 1 g/m²·day or more.

The barrier material in an aspect may have a light transmittance at 550 nm per 1 mm thickness of 95% or more.

The present invention also provides a product comprising a member and the barrier material formed on the member.

The present invention also provides a product comprising a first member, a second member, and the barrier material disposed between the first member and the second member, the first member being joined to the second member via the barrier material.

The present invention further provides a product assembled from a plurality of members comprising a moisture resistant member having the barrier material.

Advantageous Effects of Invention

According to the present invention, a barrier material applicable to objects in various shapes, excellent in moisture resistance, capable of sufficiently suppressing the fracture of the object due to expansion of moisture that has entered the internal part, even when exposed to a high temperature environment. The present invention can also provide a barrier material formation composition for forming the barrier material. Further, the present invention can provide a production method for the barrier material, a product comprising the barrier material, and a production method for the product.

DESCRIPTION OF EMBODIMENTS

Preferred embodiments of the present invention are described as follows. Herein, a numerical range indicated with "to" indicates a range including numerical values described before and after "to" as the minimum value and the maximum value, respectively. "A or B" means any one of A and B or both. The materials exemplified in the present embodiment may be used singly or in combination of two or more unless otherwise specified.

<Barrier Material Formation Composition>

The barrier material formation composition according to the present embodiment comprises a silane oligomer, at least a part of the silane oligomer being modified with a metal alkoxide.

By applying such a composition to an object and heating, a barrier material excellent in moisture resistance can be easily formed on the object. Further, the barrier material to be formed has flexibility and dehumidifying property, so that even when the moisture which has entered the internal part of the object expands by heating, the barrier material functions as a buffer material or allows the expanded steam to escape to the outside, sufficiently suppressing the fracture of the object.

Further, having an excellent moisture resistance and appropriate dehumidifying property, the barrier material can significantly reduce the internal moisture by drying when water has permeated into the inside of the object sealed with the barrier material.

The barrier material formation composition in the present embodiment may be, for example, in a liquid form or in a paste form. In view of easiness in application to an object, it is preferable that the barrier material formation composition be in a liquid form.

The silane oligomer is a polymer of silane monomers, having a structure in which a plurality of silicon atoms is connected via an oxygen atom. Herein, a silane oligomer refers to a polymer having a molecular weight of 100000 or less.

Herein, the silane oligomer modified with a metal alkoxide refers to a compound formed by a reaction between a silane oligomer and a metal alkoxide, and may refer to a compound having a structure in which a silicon atom derived from a silane oligomer bonds to a metal atom derived from a metal alkoxide via an oxygen atom.

The silane oligomer modified with a metal alkoxide (hereinafter referred to a "modified silane oligomer" in some cases) may be a reactant of a silane oligomer and a metal alkoxide, or may be a reactant of silane monomer and a metal alkoxide. In the latter case, the silane oligomer structure may be formed by reacting a silane monomer with a metal alkoxide and further reacting the resultant with another silane monomer, or may be formed by reacting a silane oligomer formed by a reaction between silane monomers with a metal alkoxide.

In the composition in the present embodiment, not all of the silane oligomers contained in the composition are required to be modified with a metal alkoxide, and at least only a part of the silane oligomers may be modified with a metal alkoxide.

The silicon atoms contained in a silicon oligomer can be classified into a silicon atom bonded to one oxygen atom (M unit), a silicon atom bonded to two oxygen atoms (D unit), a silicon atom bonded to three oxygen atoms (T unit) and a silicon atom bonded to four oxygen atoms (Q unit). Examples of the M unit, D unit, T unit and Q unit include the following formulas (M), (D), (T) and (Q), respectively.

[Chemical Formula 1]

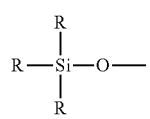

(M)

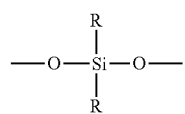

(D)

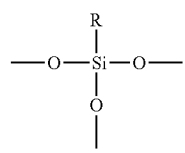

(T)

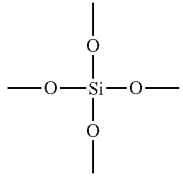
(Q)

In the formulas, R represents an atom other than an oxygen atom (e.g., hydrogen atom) or an atomic group (e.g., alkyl group) bonded to silicon. The data on the content of these units can be obtained from Si—NMR.

In a silane oligomer, the ratio of the total number of the T units and the Q units relative to the total number of silicon atoms in the silane oligomer is preferably 50% or more, more preferably 70% or more, still more preferably 90% or more, or may be 100%. Such a silane oligomer enables to obtain a barrier material further excellent in moisture resistance.

In a preferred aspect, the silane oligomer contains the T unit. The content of the T unit in the silane oligomer relative to the total number of silicon atoms is, for example, 10% or more, preferably 20% or more, 30% or more, 40% or more, 50% or more, 70% or more, 80% or more, or 90% or more, or may be 100%. With such a silane oligomer, the flexibility and the dehumidifying property tend to be further improved.

In a preferred aspect, the content of the Q unit in the silane oligomer relative to the total number of silicon atoms is, for example, 50% or more, preferably 70% or more, more preferably 80% or more, still more preferably 90% or more, or may be 100%. With such a silane oligomer, the moisture resistance and the transparency tend to be further improved.

It is preferable that the silane oligomer have an alkyl group or an aryl group as R in the formulas (M), (D), (T) and (Q) described above.

As the alkyl group, an alkyl group having 6 or less carbon atoms is preferred, and an alkyl group having 4 or less carbon atoms is more preferred. Specific examples of the alkyl group include a methyl group, an ethyl group, a propyl group and a butyl group, and among them, a methyl group, an ethoxy group, and a propyl group are preferred, and a methyl group is more preferred.

Examples of the aryl group include a phenyl group and a substituted phenyl group. Examples of the substituent of the substituted phenyl group include an alkyl group, a vinyl group, a mercapto group, an amino group, a nitro group, and a cyano group. As the aryl group, a phenyl group is preferred.

The weight average molecular weight of the silane oligomer may be, for example, 400 or more, being preferably 600 or more, more preferably 1000 or more. The weight average molecular weight of the silane oligomer may be, for example, 30000 or less, being preferably 10000 or less, more preferably 6000 or less. With a large weight average molecular weight of the silane oligomer, the flexibility and the dehumidifying property tend to be further improved, and with a small weight average molecular weight, the moisture resistance and the transparency tend to be further improved. Herein, the weight average molecular weight of a silane oligomer refers to the weight average molecular weight value in terms of polystyrene measured by gel permeation chromatography (GPC).

The metal alkoxide may be represented by, for example, $M(OR^1)_n$. M represents an n-valent metal atom and IV represents an alkyl group. And n represents a positive number.

Preferably, n is 2 to 5, more preferably 3 to 4.

Examples of the M include aluminum, titanium, zirconium and niobium, and among them, aluminum, titanium and zirconium are preferred, and aluminum is more preferred. In other words, examples of the metal alkoxide include an aluminum alkoxide, a titanium alkoxide, a zirconium alkoxide and a niobium alkoxide, and among them, an aluminum alkoxide, a titanium alkoxide and a zirconium alkoxide are preferred, and an aluminum alkoxide is more preferred.

As $R^1$, an alkyl group having 1 to 6 carbon atoms is preferred, and an alkyl group having 2 to 4 carbon atoms is more preferred. Specific examples of the alkyl group $R^1$ include a methyl group, an ethyl group, a propyl group and a butyl group, and among them, an ethyl group, a propyl group and a butyl group are preferred, and a propyl group and a butyl group are more preferred.

The composition in the present embodiment may comprise a modified silane oligomer made of 100 parts by mass of a silane oligomer modified with 0.1 to 50 parts by mass of a metal alkoxide. The amount of the metal alkoxide relative to 100 parts by mass of the silane oligomer is preferably 1 part by mass or more, more preferably 5 parts by mass or more, and preferably 30 parts by mass or less, more preferably 20 parts by mass or less. With increase in the amount of the metal alkoxide, the curability tends to be improved, and with decrease in the amount of the metal alkoxide, the transparency tends to be further improved.

The composition in the present embodiment may further contain a silane monomer. By addition of a silane monomer, for example, the content of the T unit and the Q unit in the barrier material can be adjusted, so that effects such as transparency and flexibility can be imparted to the barrier material according to the use. Further, by addition of a silane monomer, a barrier material further excellent in moisture resistance tends to be obtained.

The content of the silane monomer is not particularly limited, and may be, for example, 10 parts by mass or more, preferably 20 parts by mass or more, and more preferably 30 parts by mass or more, relative to 100 parts by mass of the silane oligomer. Due to this, the effects described above are more remarkably exhibited. The content of the silane monomer may be, for example, 100 parts by mass or less, or 60 parts by mass or less, preferably 50 parts by mass or less, more preferably 40 parts by mass or less. With a content in such a range, the curability tends to be improved. Herein, "100 parts by mass of silane oligomer" does not include the mass of a metal alkoxide modifying a silane oligomer, meaning that the total amount of the silane oligomer moiety in a modified silane oligomer and an unmodified silane oligomer is taken as 100 parts by mass.

As the silane monomer, a trifunctional monomer containing a silicon atom bonded to three oxygen atoms and a tetrafunctional monomer containing a silicon atom bonded to four oxygen atoms can be suitably used.

Examples of the trifunctional monomer include an alkyltrialkoxysilane and an aryltrialkoxysilane. The alkyltrialkoxysilane is a silane compound having a silicon atom to which one alkyl group and three alkoxy groups are bonded. The aryltrialkoxysilane is a silane compound having a silicon atom to which one aryl group and three alkoxy groups are bonded.

As the alkyl group of the alkyltrialkoxysilane, an alkyl group having 6 or less carbon atoms is preferred, and an alkyl group having 4 or less carbon atoms is more preferred. Specific examples of the alkyl group include a methyl group, an ethyl group, a propyl group, and a butyl group. Among them, a methyl group, an ethyl group, and a propyl group are preferred, and a methyl group is more preferred. Further, as the alkoxy group of the alkyltrialkoxysilane, an alkoxy group having 6 or less carbon atoms is preferred, and an alkoxy group having 4 or less carbon atoms is more preferred. Specific examples of the alkoxy group include a methoxy group, an ethoxy group, a propoxy group and a butoxy group. Among them, a methoxy group, an ethoxy group and a propoxy group are preferred, and a methoxy group and an ethoxy group are more preferred.

Examples of the aryl group of the aryltrialkoxysilane include a phenyl group and a substituted phenyl group. Examples of the substituent of the substituted phenyl group include an alkyl group, a vinyl group, a mercapto group, an amino group, a nitro group, and a cyano group. As the aryl group, a phenyl group is preferred. Further, as the alkoxy group of the aryltrialkoxysilane, an alkoxy group having 6 or less carbon atoms is preferred, and an alkoxy group having 4 or less carbon atoms is more preferred. Specific examples of the alkoxy group include a methoxy group, an ethoxy group, a propoxy group and a butoxy group. Among them, a methoxy group, an ethoxy group and a propoxy group are preferred, and a methoxy group and an ethoxy group are more preferred.

Specific examples of the trifunctional monomer include methyltrimethoxysilane, methyltriethoxysilane, ethyltrimethoxysilane, and ethyltriethoxysilane.

Examples of the tetrafunctional monomer include a tetraalkoxysilane. The tetraalkoxysilane is a silane compound having a silicon atom to which four alkoxy groups are bonded.

As the alkoxy group of the tetraalkoxysilane, an alkoxy group having 6 or less carbon atoms is preferred, and an alkoxy group having 4 or less carbon atoms is more preferred. Specific examples of the alkoxy group include a methoxy group, an ethoxy group, a propoxy group and a butoxy group. Among them, a methoxy group, an ethoxy group and a propoxy group are preferred, and a methoxy group and an ethoxy group are more preferred.

Specific examples of the tetrafunctional monomer include a tetramethoxysilane, a tetraethoxysilane, a tetrapropoxysilane, and a tetrabutoxysilane.

The composition in the present embodiment may further comprise a liquid medium. Examples of the liquid medium include water and an organic solvent.

Examples of the organic solvent include alcohols, ethers, ketones, esters, and hydrocarbons. Besides these, acetonitrile, acetamide, N,N-dimethylformamide, N,N-dimethylacetamide, N-methylpyrrolidone, etc., may also be used.

In a preferred aspect, the composition may comprise water and alcohols as a liquid medium. Use of such a liquid medium enables to easily obtain a barrier material excellent in transparency.

As the alcohols, ones which can be vaporized by heating during formation of the barrier material are preferred. As the alcohols, for example, alcohols having 6 or less carbon atoms are preferred, and alcohols having 1 to 4 carbon atoms are more preferred.

As the alcohols, for example, alcohols corresponding to the alkoxy group of a metal alkoxide may be used. In other words, for example, in the case of a metal alkoxide having a tert-butoxy group, tert-butyl alcohol may be used as the alcohols. The transparency tends to be further improved thereby.

The content of the liquid medium is not particularly limited, and may be, for example, a content which provides a viscosity suitable for application of the composition is obtained. The viscosity of the composition is not particularly limited and may be appropriately adjusted depending on the thickness of a barrier material to be produced, the application method, the shape of a target, and the like.

The viscosity of the composition at 25° C. may be, for example, 1 to 6000 mPa·s, and it is preferable that the viscosity be 5 to 3000 mPa·s. Such a composition enables the application to a target and the formation of the barrier material on a target to be made more easily.

In the composition in the present embodiment, the molar ratio of the metal atom M derived from the metal alkoxide to the total number of silicon atoms derived from the silane oligomer and the silane monomer (M/Si) may be, for example, 0.0001 or more, being preferably 0.001 or more. The curability tends to be further improved thereby. The molar ratio (M/Si) may be, for example, 0.5 or less, being preferably 0.2 or less. The transparency tends to be further improved thereby.

The composition in the present embodiment may further contain a curing catalyst. The curing catalyst is not particularly limited as long as it accelerates the polymerization reaction of the silane oligomer and the silane monomer.

Examples of the curing catalyst include an acid catalyst such as hydrochloric acid, nitric acid, sulfuric acid, acetic acid, and phosphoric acid, a metal catalyst such as tin, titanium, aluminum, zinc, iron, cobalt, and manganese, and a base catalyst such as aliphatic amines, ammonium hydroxide, tetraethylammonium hydroxide, sodium carbonate, and sodium hydroxide.

The content of the curing catalyst may be, for example, 0.1 parts by mass or more, being preferably 1 part by mass or more, and may be 20 parts by mass or less, being preferably 10 parts by mass or less, relative to 100 parts by mass of the silane oligomer.

The composition in the present embodiment may further contain other components other than the above. Examples of the other components include a resin having a hydroxyl group in the molecular structure, a metal oxide particle, and a metal oxide fiber. Examples of the resin having a hydroxyl group in the molecular structure include polyvinyl alcohol. Further, examples of the metal oxide particle include a silica particle and an alumina particle, and it is preferable that these particles be nano-sized particles (for example, the particle diameter is 1 nm or more and less than 1000 nm), (in other words, a nano-silica particle and a nano-alumina particle are preferred). Examples of the metal oxide fiber include an alumina fiber, and it is preferable that these metal oxide fibers have a nano-sized diameter (for example, the fiber diameter is 1 nm or more and less than 1000 nm), (in other words, an alumina nanofiber is preferred).

The content of the other components is not particularly limited as long as it is in the range in which the effects described above can be obtained. For example, the content may be 50 parts by mass or less relative to 100 parts by mass of the silane oligomer, being preferably 40 parts by mass or less. Also, the content of the other components may be, for example, 10 parts by mass or more, or 20 parts by mass or more, relative to 100 pars by mass of the silane oligomer.

Examples of the production method for the composition in the present embodiment include the following methods.

<Production Method for Composition 1>

The present production method comprises a modification step of modifying at least a part of a silane oligomer with a metal alkoxide by a reaction between the silane oligomer and the metal alkoxide. In the modification step, the metal alkoxide reacts with the silane oligomer to form a bonding of metal atom-oxygen atom-silicon atom.

The reaction may be performed in a liquid medium. Examples of the liquid medium include the same ones described above. The amount of the liquid medium is not particularly limited and may be, for example, an amount at which the concentration of the silane oligomer in the reaction solution is in the range of 50 to 99 mass % (preferably 80 to 95 mass %).

The reaction conditions of the reaction are not particularly limited. For example, the reaction temperature of the reaction may be 60 to 100° C. or may be 70 to 90° C. Also, the reaction time of the reaction may be, for example, 0.5 to 5.0 hours or may be 1.0 to 3.0 hours.

The present production method may further comprise a step of adding a silane oligomer to the reaction solution after the modification step. A composition containing the silane oligomer modified with a metal alkoxide and an unmodified silane oligomer can be obtained thereby.

The present production method may further comprise a step of adding a silane monomer to the reaction solution after the modification step. In other words, the present production method may comprise a first step of providing a silane oligomer with at least a part thereof modified with a metal alkoxide, and a second step of mixing the modified silane oligomer and a silane monomer to obtain a barrier material formation composition, wherein the first step may be the modification step. A composition containing the silane monomer can be obtained thereby.

Also, the present production method may further comprise a step of adding another component to the reaction solution after the modification step. Also, the present production method may further comprise a step of adding a liquid medium to the reaction solution after the modification step, or a step of substituting the liquid medium in the reaction solution with another liquid medium after the modification step. Through these steps, from the reaction solution after the modification step, the above-described compositions in various aspects can be prepared.

<Production Method for Composition 2>

The present production method comprises a modification step of causing a reaction between a silane monomer and a metal alkoxide to form a silane oligomer with at least thereof a part modified with the metal alkoxide. In the modification step, a silane oligomer is formed by polymerization of the silane monomer, and the silane oligomer formed may be modified with a metal alkoxide. Also, in the modification step, after the silane monomer is modified with a metal alkoxide, a silane oligomer moiety may be formed by a reaction between the modified silane monomer and the other silane monomer.

The reaction described above may be performed in a liquid medium. Examples of the liquid medium may include the same ones described above. The amount of the liquid medium is not particularly limited and may be an amount at which the concentration of the silane monomer in the reaction solution is 50 to 99 mass % (preferably 80 to 95 mass %).

The reaction conditions of the reaction are not particularly limited. For example, the reaction temperature of the reaction may be 60 to 100° C. or may be 70 to 90° C. Also, the reaction time of the reaction may be, for example, 0.5 to 5.0 hours or may be 1.0 to 3.0 hours.

The present production method may further comprise a step of adding a silane oligomer to the reaction solution after the modification step. A composition containing the silane oligomer modified with a metal alkoxide and an unmodified silane oligomer can be obtained thereby.

The present production method may further comprise a step of adding a silane monomer to the reaction solution after the modification step. In other words, the present production method may comprise a first step of providing a silane oligomer with at least a part thereof modified with a metal alkoxide, and a second step of mixing the silane oligomer and a silane monomer to obtain a barrier material formation composition, wherein the first step may be the modification step. A composition containing the silane monomer can be obtained thereby.

Also, the present production method may further comprise a step of adding another component to the reaction solution after the modification step. Also, the present production method may further comprise a step of adding a liquid medium to the reaction solution after the modification step, or a step of substituting the liquid medium in the reaction solution with another liquid medium after the modification step. Through these steps, from the reaction solution after the modification step, the above-described compositions in various aspects can be prepared.

<Barrier Material>

The barrier material in the present embodiment comprises a polysiloxane compound doped with a metal atom. The barrier material may be formed by heating the barrier material formation composition described above. By the heating, the silane oligomer and the silane monomer in the composition are polymerized to form a polysiloxane compound. On this occasion, the silane oligomer is modified with a metal alkoxide, so that a metal atom derived from the metal alkoxide is doped into the polysiloxane compound formed.

The polysiloxane compound has a siloxane skeleton. In the polysiloxane compound, a metal atom is bonded to the silicon atom constituting the polysiloxane skeleton via an oxygen atom.

The silicon atoms contained in a polysiloxane compound can be classified into a silicon atom bonded to one oxygen atom (M unit), a silicon atom bonded to two oxygen atoms (D unit), a silicon atom bonded to three oxygen atoms (T unit) and a silicon atom bonded to four oxygen atoms (Q unit). Examples of the M unit, D unit, T unit and Q unit include the formulas (M), (D), (T) and (Q) described above, respectively.

In the polysiloxane compound, the ratio of the total number of the T units and the Q units relative to the total number of silicon atoms in the silane oligomer is preferably 50% or more, more preferably 70% or more, still more preferably 90% or more, or may be 100%. With such a polysiloxane compound, the moisture resistance of a barrier material is further improved.

In a preferred aspect, it is preferable that the polysiloxane compound contain the T unit. The content of the T unit in the polysiloxane compound relative to the total number of silicon atoms may be, for example, 10% or more, 20% or more, 30% or more, 40% or more, or 50% or more, being preferably 70% or more, more preferably 80% or more, still more preferably 90% or more, or may be 100%. With such a polysiloxane compound, the flexibility and the dehumidifying property tend to be further improved.

In another preferred aspect, the content of the Q unit in the polysiloxane compound relative to the total number of silicon atoms may be, for example, 50% or more, being preferably 70% or more, more preferably 80% or more, still more preferably 90% or more, or may be 100%. With such a polysiloxane compound, the moisture resistance and the transparency tend to be further improved.

In the polysiloxane compound, the molar ratio of the metal atom M to the total number of silicon atoms (Si), M/Si, may be, for example, 0.0001 or more, being preferably 0.001 or more. The curability tends to be further improved thereby. The molar ratio (M/Si) may be, for example, 0.5 or less, being preferably 0.2 or less. The transparency tends to be further improved thereby.

It is preferable that in the polysiloxane compound, most of the oxygen atoms be bonded to at least one silicon atom. With a less amount of alcoholic hydroxyl groups (C—OH), ether bonds (C—O—C) and the like being present in the polysiloxane compound, the moisture resistance and the dehumidifying property tend to be further improved. For example, among oxygen atoms in the polysiloxane compound, for example, 90% or more of the oxygen atoms is preferably bonded to a silicon atom, 95% or more of the oxygen atoms is preferably bonded to a silicon atom, and 99% or more of oxygen atoms is preferably bonded to a silicon atom.

The barrier material has a low moisture vapor transmission rate and therefore excellent moisture resistance. The moisture vapor transmission rate (40° C., 95% RH) per 25 μm thickness may be, for example, 600 g/m$^2$·day or less, being preferably 300 g/m$^2$·day or less, more preferably 100 g/m$^2$·day or less.

Also, the moisture vapor transmission rate (40° C., 95% RH) per 25 μm thickness may be, for example, 1 g/m$^2$·day or more, being preferably 10 g/m$^2$·day or more. Such a barrier material has dehumidifying property, and is capable of sufficiently suppressing the fracture of the object due to expansion of moisture that has entered the internal part, even when used under a high temperature environment. The moisture vapor transmission rate of a barrier material is a value measured by the humidity sensor method (Lyssy method) in accordance with JIS K7129.

The barrier material may have transparency. Such a barrier material can be suitable for use requiring transparency such as coating material covering an image sensor in an image sensor package. Having transparency herein means that the visible light transmittance (light transmittance at 550 nm) per 1 mm thickness is 95% or more.

The barrier material has a visible light transmittance (light transmittance at 550 nm) per 1 mm thickness of preferably 95% or more, more preferably 97% or more, and still more preferably 99% or more. The visible light transmittance of the barrier material is measured by a spectrophotometer.

The shape of the barrier material is not particularly limited. The barrier material may be formed, for example, in a film form, and such a barrier material can be used as a moisture resistant barrier film. Also, the barrier material may be formed to fill a void space between members, and in that case, the moisture is prevented from entering from the void space. Also, the barrier material may be formed to cover the members, and in that case, the members can be prevented from contacting with the moisture.

<Production Method for Barrier Material>

The production method in the present embodiment comprises a heating step of heating the composition described above to form a barrier material. In the production method, the silane oligomer and the silane monomer in the composition are polymerized by heating to form a polysiloxane compound. On this occasion, at least a part of the silane oligomer in the composition is modified with a metal alkoxide, so that the metal atom derived from the metal alkoxide is doped into the polysiloxane compound.

In the heating step, the liquid medium in the composition may be removed by heating. In other words, the heating step may be a step of forming a barrier material containing a polysiloxane compound.

The heating temperature in the heating step is not particularly limited and may be a temperature at which the silane oligomer can be polymerized. Also, when the composition contains a liquid medium, it is preferable that the heating temperature be a temperature at which the liquid medium volatilizes. The heating temperature may be, for example, 70° C. or more, being preferably 100° C. or more. Also, the heating temperature may be, for example, 200° C. or less, being preferably 170° C. or less.

The present production method may further comprise an application step of applying the composition. On that occasion, it can be said that the heating step is a step of heating the applied composition.

The application method is not particularly limited and may be appropriately changed depending on the shape of a target to be coated, and thickness of the barrier material.

In the present production method, the composition may be applied to a target requiring moisture resistance to form a barrier material on the target. Also, in the present production method, after production of a barrier material in a predetermined shape, the barrier material produced may be applied to a target.

<Use of Barrier Material>

The use of the barrier material in the present embodiment is not particularly limited and the barrier material can be suitably applied to various uses requiring moisture resistance. For example, the barrier material can be suitably used as a moisture resistant barrier material for electronic components.

The barrier material in the present embodiment can sufficiently suppress the fracture due to expansion of moisture that has entered the internal part in a high temperature environment (e.g., 100° C. or more). The barrier material can be suitably used as a moisture resistant barrier material for electronic components used in a high temperature environment, a moisture resistant barrier material for electronic components passing through a high temperature step during implementation, and the like. Specifically, the barrier material can be suitably used, for example, as a barrier material for power semiconductors, a barrier material for image sensors, and a moisture resistant barrier material for displays.

A preferred embodiment of uses of the barrier material is described in detail below, though the uses of the barrier material are not limited thereto.

Use Example 1

The use in an embodiment relates to a product having a moisture resistant treated member. Such a product comprises a member and a barrier material formed on the member. The barrier material may be formed on one member or may be formed on a plurality of members. For example, the barrier material may be formed to cover one or more members or may be formed to cover a junction between two members.

These products are produced by a production method comprising a first step of applying the barrier material formation composition to a member, and a second step of heating the applied composition to form a barrier material on the member.

Specific examples of the use include the following electronic components.

(Electronic Component A-1)

The electronic component in an embodiment comprises a substrate, a cover glass, an image sensor disposed between the substrate and the cover glass, a supporting member supporting the cover glass and the image sensor on the substrate, and the barrier member disposed on the junction between the cover glass and the supporting member.

The barrier material is excellent in moisture resistance, capable of sufficiently suppressing the fracture of the cover glass, the supporting member and the like due to expansion of moisture that has entered the internal part, even when used in a high temperature environment. The electronic component, therefore, is excellent in moisture resistance and even when moisture has entered the void space between the cover glass and the substrate, the fracture of the cover glass, the supporting member, or the like due to expansion of the moisture can be sufficiently prevented.

Such an electronic component can be produced, for example, by a production method comprising an application step of applying the barrier material formation composition to the junction between the supporting member and the cover glass, and a barrier material formation step of heating the applied composition to form a barrier material on the junction.

(Electronic Component A-2)

The electronic component in an embodiment comprises a substrate, an image sensor disposed on the substrate, and the barrier material disposed on the image sensor.

The barrier material can be made to have excellent moisture resistance and transparency. The barrier material, therefore, can be suitably used also as a sealing material for sealing an image sensor. Such an electronic component enables an image sensor package to be constructed without use of a cover glass, so that reduction in component size, improvement in handling, etc., can be expected.

In the use, the visible light transmittance (550 nm) per 1 mm thickness of the barrier material is preferably 95% or more, more preferably 97% or more, still more preferably 99% or more.

Such an electronic component can be produced, for example, by a production method comprising an application step of applying the barrier material formation composition to an image sensor, and a barrier material formation step of heating the applied composition to form a barrier material on the image sensor.

Use Example 2

A use in an embodiment relates to a product having a first member and a second member joined to the first member, and a moisture resistant treated junction between the first member and the second member. Such a product comprises a first member, a second member, and a barrier material disposed between the first member and the second member, the first member and the second member being joined via the barrier material.

Such a product can be produced by a production method comprising a first step of disposing a barrier material formation composition between the first member and the second member, and a second step of joining the first member and the second member via the barrier material.

Specific examples of the use include the following electronic components.

(Electronic Component B-1)

The electronic component in an embodiment comprises a substrate, a cover glass, an image sensor disposed between the substrate and the cover glass, a supporting member supporting the cover glass and the image sensor on the substrate, and a barrier material joining the cover glass and the supporting member.

The barrier material is excellent in moisture resistance, capable of sufficiently suppressing the fracture due to expansion of moisture that has entered the internal part, even when used in a high temperature environment. The electronic component, therefore, is excellent in moisture resistance and even when moisture has entered a void space between the cover glass and the substrate, the fracture of the cover glass, the supporting member, or the like due to expansion of the moisture can be sufficiently prevented.

Such an electronic component can be produced, for example, by a production method comprising a step of disposing the barrier material formation composition between the supporting member and the cover glass, and a step of heating the composition to form a barrier material such that the supporting member and the cover glass are joined via the barrier material.

Use Example 3

The use in an embodiment relates to a product comprising a moisture resistant member. Such a product comprises a moisture resistant member made of barrier material and may be, for example, an assembly of a plurality of members including the moisture resistant member.

Such a product can be produced by a production method comprising a first step of heating the barrier material formation composition to make a moisture resistant member made of barrier material, and a second step of putting a plurality of members including the barrier material together.

Specific examples of the use include the following electronic components.

(Electronic Component C-1)

The electronic component in an embodiment comprises at least one component selected from the group consisting of a substrate, an MEMS sensor, a wireless module and a camera module, and a moisture resistant member having a barrier material.

The barrier material is excellent in moisture resistance and dehumidifying property. The electronic component described above is therefore in excellence in moisture resistance, so that the degradation in sensing properties due to moisture absorption can be sufficiently prevented.

Such an electronic component can be produced, for example, by a production method comprising a step of heating a barrier material formation composition to make a moisture resistant member having a barrier material, and a step of putting a plurality of members including the moisture member together. The barrier material may be formed independently from the substrate and the components or may be integrally formed with the components by heating the barrier material formation composition applied to the components.

Although the preferred embodiment of the present invention has been described above, the present invention is not limited thereto.

EXAMPLES

The present invention is more specifically described with reference to Examples as follows, though the present invention is not limited thereto.

Example 1

[Barrier Material Formation Composition 1]

After mixing of 3.8 parts by mass of aluminum sec-butoxide (manufactured by Matsumoto Fine Chemical Co., Ltd., product name: AL-3001, hereinafter abbreviated as "AL-3001"), 7.6 parts by mass of tert-butyl alcohol (manufactured by Wako Pure Chemical Industries, Ltd.), 0.3 parts by mass of water, and 64.9 parts by mass of a silane oligomer (product name: XR31-B1410, manufactured by Momentive Performance Materials), a reaction was performed at 70° C. for 1 hour. Subsequently, 23.4 parts by mass of methyltrimethoxysilane (manufactured by Shin-Etsu Chemical Co., Ltd., product name: KBM-13, hereinafter abbreviated as "MTMS") was mixed therewith to obtain a barrier material formation composition 1.

[Substrate with Barrier Material 1 for Evaluation]

One side of a 0.4 mm thick copper-clad laminate MCL-E-705G (product name, manufactured by Hitachi Chemical Co., Ltd.) was masked and immersed in a copper etching solution to remove the copper foil on the single side, so that a 40 mm square base substrate was made. Subsequently, the barrier material formation composition 1 was applied to the side of the base substrate with the copper foil removed so as to have a thickness of 35 μm after drying and dried at 150° C. for 4 hours. A barrier material was thus formed on the substrate, and a substrate with barrier material 1 for evaluation was obtained.

Example 2

[Barrier Material Formation Composition 2]

After mixing of 3.8 parts by mass of AL-3001, 7.6 parts by mass of tert-butyl alcohol, 0.3 parts by mass of water, and 64.9 parts by mass of a silane oligomer (product name: XR31-B2733, manufactured by Momentive Performance Materials), a reaction was performed at 70° C. for 1 hour. Subsequently, 23.4 parts by mass of tetraethoxysilane (manufactured by Wako Pure Chemical Industries, Ltd., hereinafter abbreviated as "TEOS") was mixed therewith to obtain a barrier material formation composition 2.

[Substrate with Barrier Material 2 for Evaluation]

A barrier material was formed on a substrate in the same manner as in Example 1 except that the barrier material formation composition 1 was changed to the barrier material formation composition 2, so that a substrate with barrier material 2 for evaluation was obtained.

Example 3

[Barrier Material Formation Composition 3]

A barrier material formation composition 3 was obtained in the same manner as in Example 2, except that 23.4 parts by mass of MTMS was mixed instead of TEOS.

[Substrate with Barrier Material 3 for Valuation]

A barrier material was formed on a substrate in the same manner as in Example 1 except that the barrier material formation composition 1 was changed to the barrier material formation composition 3, so that a substrate with barrier material 3 for evaluation was obtained.

Example 4

[Barrier Material Formation Composition 4]

After mixing of 3.8 parts by mass of AL-3001, 7.6 parts by mass of tert-butyl alcohol, 0.3 parts by mass of water, and 64.9 parts by mass of a silane oligomer (product name: TSR-165, manufactured by Momentive Performance Materials), a reaction was performed at 70° C. for 1 hour. Subsequently, 23.4 parts by mass of TEOS was mixed therewith to obtain a barrier material formation composition 4.

[Substrate with Barrier Material 4 for Evaluation]

A barrier material was formed on a substrate in the same manner as in Example 1 except that the barrier material formation composition 1 was changed to the barrier material formation composition 4, so that a substrate with barrier material 4 for evaluation was obtained.

Example 5

[Barrier Material Formation Composition 5]

A barrier material formation composition 5 was obtained in the same manner as in Example 1, except that 23.4 parts by mass of TEOS was mixed instead of MTMS and that 2.0 parts by mass of CR15 (product name, manufactured by Momentive Performance Materials) was further mixed as a curing catalyst.

[Substrate with Barrier Material 5 for Evaluation]

A barrier material was formed on a substrate in the same manner as in Example 1 except that the barrier material formation composition 1 was changed to the barrier material formation composition 5, so that a substrate with barrier material 5 evaluation was obtained.

Example 6

[Barrier Material Formation Composition 6]

To the barrier material formation composition 2 in Example 2, 2.0 parts by mass of a curing catalyst (CR15) was further mixed, so that a barrier material formation composition 6 was obtained.

[Substrate with Barrier Material 6]

A barrier material was formed on a substrate in the same manner as in Example 1 except that the barrier material formation composition 1 was changed to the barrier material formation composition 6, so that a substrate with barrier material 6 for evaluation was obtained.

Example 7

[Barrier Material Formation Composition 7]

To the barrier material formation composition 3 in Example 3, 2.0 parts by mass of a curing catalyst (CR15) was further mixed, so that a barrier material formation composition 7 was obtained.

[Substrate with Barrier Material 7 for Evaluation]

A bather material was formed on a substrate in the same manner as in Example 1, except that the barrier material formation composition 1 was changed to the barrier material formation composition 7, so that a substrate with barrier material 7 for evaluation was obtained.

Example 8

[Barrier Material Formation Composition 8]

A barrier material formation composition 8 was obtained in the same manner as in Example 2, except that 23.4 parts by mass of methyl silicate MS53A (product name, manufactured by Colcoat Co., Ltd.) was mixed instead of TEOS.

[Substrate with Barrier Material 8 for Evaluation]

A substrate with barrier material 8 for evaluation was obtained in the same manner as in Example 1, except that the barrier material formation composition 1 was changed to the barrier material formation composition 8.

Example 9

[Barrier Material Formation Composition 9]

After mixing of 3.8 parts by mass of AL-3001, 7.6 parts by mass of tert-butyl alcohol, 0.3 parts by mass of water, and 64.9 parts by mass of MTMS, a reaction was performed at 70° C. for 1 hour. Subsequently, 23.4 parts by mass of TEOS was mixed therewith, and 2.0 parts by mass of a curing catalyst (CR15) was further mixed with the resultant to obtain a barrier material formation composition 9.

[Substrate with Barrier Material 9 for Evaluation]

A substrate with barrier material 9 for evaluation was obtained in the same manner as in Example 1, except that the barrier material formation composition 1 was changed to the barrier material formation composition 9.

Comparative Example 1

[Comparative Substrate 1 for Evaluation]

A 0.4 mm thick, 40 mm square copper-clad laminate MCL-E-705G was used as the substrate for evaluation in Comparative Example 1 (Comparative substrate 1 for evaluation).

Comparative Example 2

[Comparative Substrate 2 for Evaluation]

A base substrate made by the method described in Example 1 was used as the substrate for evaluation in Comparative Example 2 (Comparative substrate 2 for evaluation).

The water absorption ratio under constant temperature and humidity and the dehumidification ratio under high temperature of the substrates for evaluation obtained in Examples and Comparative Examples were measured and evaluated by the following method. The results are shown in Table 1.

<(1) Measurement of Water Absorption Ratio Under Constant Temperature and Humidity>

The substrate for evaluation was dried at 130° C. for 1 hour in a safety oven (product name: SPHH-202, manufactured by Espec Corp.) to obtain a measurement sample. The mass of the obtained measurement sample was measured to determine the initial mass m1. Subsequently, the measurement sample was treated in an atmosphere at 85° C./85% RH in a constant temperature and humidity chamber (product name: SE-44CI-A, manufactured by KATO Inc.) for 100 hours, so that a sample after the constant temperature and humidity treatment was obtained. The mass of the measurement sample after the constant temperature and humidity treatment was measured to determine the mass m2 after the constant temperature and humidity treatment. From the initial mass m1 and the mass m2 after the constant temperature and humidity treatment, the water absorption ratio $Q_A$ (%) was determined based on the following expression.

$$Q_A = 100 \times (m1-m2)/m2$$

<(2) Measurement of Dehumidification Ratio Under High Temperature>

The measurement sample after the constant temperature and humidity treatment in (1) described above was dried at 130° C. for 1 hour in a safety oven (product name: SPHH-202, manufactured by Espec Corp.) to obtain a measurement sample after the high temperature treatment. The mass m3 of the measurement sample after the high temperature treatment was measured, and the dehumidification ratio $Q_D$ (%) was determined from m1, m2 and m3 described above based on the following expression.

$$Q_D = 100 \times \{1-(m3-m2)/(m1-m2)\}$$

TABLE 1

| | Water absorption ratio | Dehumidification ratio |
|---|---|---|
| Example 1 | 0.26 | 98.4 |
| Example 2 | 0.21 | 98.6 |
| Example 3 | 0.29 | 98.4 |
| Example 4 | 0.24 | 98.2 |
| Example 5 | 0.20 | 98.6 |
| Example 6 | 0.20 | 98.8 |
| Example 7 | 0.27 | 98.6 |
| Example 8 | 0.19 | 98.8 |
| Example 9 | 0.20 | 98.6 |
| Comparative Example 1 | 0.09 | 66.6 |
| Comparative Example 2 | 0.46 | 65.2 |

From the comparison between Examples 1 to 9 and Comparative Example 2, it was confirmed that the water absorption ratio under constant temperature and humidity was sufficiently suppressed by the barrier materials in Examples 1 to 9, and that the barrier materials in Examples 1 to 9 thus have excellent moisture resistance. Further, from the comparison between Examples 1 to 9 and Comparative Example 1, it was also confirmed that the barrier materials in Examples 1 to 9 are excellent in the dehumidification ratio, which is an index of the capability to allow the internal water to escape to the outside, as compared with the case of covering with a copper plate.

Further, the water absorption ratio after the measurement of the dehumidification ratio was about 0.03% in Comparative Example 1, whereas it was less than 0.005% in Examples 1 to 9. Thus, it was confirmed that use of the barrier materials in Examples 1 to 9 enables the internal water content to be significantly reduced by drying.

The light transmittance at 550 nm per 1 mm thickness of the barrier materials formed in Examples 1 to 9 was measured, resulting in 95% or more in any of Examples.

The invention claimed is:

1. A barrier material formation composition comprising a silane monomer selected from the group consisting of alkyltrialkoxysilane, aryltrialkoxysilane, and tetraalkoxysilane, and an oligomer of silane, at least a part of the oligomer of silane being modified with a metal alkoxide, and the oligomer of silane having a silicon atom bonded to three oxygen atoms, wherein the content of the silane monomer is 100 parts by mass or less relative to 100 parts by mass of the oligomer of silane.

2. The composition according to claim 1, wherein the ratio of the total number of silicon atoms bonded to three oxygen atoms each and silicon atoms bonded to four oxygen atoms each relative to the total number of silicon atoms in the oligomer of silane is 50% or more.

3. The composition according to claim 1, wherein the silane monomer contains a silicon atom bonded to three or four oxygen atoms.

4. The composition according to claim 1, wherein the metal alkoxide is an aluminum alkoxide.

5. A production method for a barrier material formation composition, comprising:
- a first step of providing an oligomer of silane oligomer with at least a part thereof modified with a metal alkoxide; and
- a second step of mixing the oligomer of silane and a silane monomer selected from the group consisting of alkyltrialkoxysilane, aryltrialkoxysilane, and tetraalkoxysilane to obtain a barrier material formation composition, wherein the content of the silane monomer is 100 parts by mass or less relative to 100 parts by mass of the oligomer of silane.

6. The production method according to claim 5, wherein the first step comprises a step of causing a reaction between an oligomer of silane and a metal alkoxide to modify at least a part of the oligomer of silane with the metal alkoxide.

7. The production method according to claim 5, wherein the first step comprises a step of causing a reaction between a silane monomer and a metal alkoxide to form an oligomer of silane with at least a part thereof modified with the metal alkoxide.

8. A production method for a barrier material, comprising a step of heating the barrier material formation composition according to claim 1 to form a barrier material.

9. A production method for a product having a moisture resistant treated member comprising:
- a first step of applying the barrier material formation composition according to claim 1 to a member; and
- a second step of heating the applied composition to form a barrier material on the member.

10. A production method for a product having a first member and a second member joined to the first member, and a moisture resistant treated joint between the first member and the second member, the production method comprising:
- a first step of disposing the barrier material formation composition according to claim 1 between a first member and a second member; and
- a second step of heating the composition to form a barrier material to join the first member to the second member via the barrier material.

11. A production method for a product having a moisture resistant member, the production method comprising:
- a first step of heating the barrier material formation composition according to claim 1 to make a moisture resistant member having a barrier material; and
- a second step of putting a plurality of members including the moisture resistant member together.

* * * * *